United States Patent [19]

Arnold

[11] 4,270,671

[45] Jun. 2, 1981

[54] DISPENSER FOR BULK PARTICULATE MATERIAL

[75] Inventor: John B. Arnold, Salina, Kans.

[73] Assignee: Archer Daniels Midland Company, Decatur, Ill.

[21] Appl. No.: 945,294

[22] Filed: Sep. 25, 1978

[51] Int. Cl.² .......................................... B65D 47/04
[52] U.S. Cl. .................................... 222/58; 222/162; 222/558; 414/294
[58] Field of Search .................. 414/294; 222/58, 77, 222/160, 162, 558

[56] References Cited

U.S. PATENT DOCUMENTS

| 1,005,522 | 10/1911 | Dull .............................. 222/162 X |
| 2,040,703 | 5/1936 | McCrery ........................ 222/558 X |
| 2,406,934 | 9/1946 | Williams et al. ................. 222/77 X |

FOREIGN PATENT DOCUMENTS 1048848 12/1953 France ..................................... 222/160

Primary Examiner—David A. Scherbel
Attorney, Agent, or Firm—Allan R. Plumley

[57] ABSTRACT

An apparatus for dispensing bulk, particulate material in a controlled choked flow in which the particulate material is fed through a vertical hopper having a closure which has its opening controlled by the weight of material in the hopper.

3 Claims, 2 Drawing Figures

DISPENSER FOR BULK PARTICULATE MATERIAL

This invention relates to an apparatus for dispensing bulk, particulate material in a controlled, choked flow, and more particularly it relates to such an apparatus for use in dispensing grain with a minimum scattering of dust.

Large supplies of particulate material, whether it be a natural product such as grain or a ground inorganic product such as sand, cement, etc. are normally stored in large containers such as a silo and portions are dispensed from such containers through conduits by gravity flow or by forced flow in whatever amounts are desired into a truck or a railroad car or some other means for delivering the material to the purchaser's location. These particulate materials normally include a substantial amount of very fine dust particles which, upon the slightest agitation, are spread throughout the surrounding atmosphere polluting it so that nearby workers must wear dust masks and also creating dangerous fire hazards. Furthermore, in many instances the dispersal of dust represents a significant loss of valuable product. It is therefore desirable for several reasons to maintain the dust production at a minimum.

It is known that the maximum amount of dust is created when the particulate material is flowing freely at a rapid rate of speed and under conditions such that the particles are flowing in an uncompacted condition. Accordingly, one of the methods minimizing dust is to cause the material to be dispensed under "choked flow" conditions. The term "choked flow" is intended to describe flow conditions under which the material is under some resistance due to a flow restriction causing a compaction of the main stream of particles and thereby only the dust particles on the periphery of the mass of compacted particles have the opportunity to be dispersed into the surrounding atmosphere. In the past there have been means suggested for accomplishing choked flow by which sensing devices judging the pressure of the material, its space velocity, etc. monitor the flow of material and provide signals which control the opening of the discharge means. The known devices are not sufficiently reliable because there are so many uncontrolled factors, such as humidity, that influence the sensing devices. It is desirable to provide a simplified means for accomplishing choked flow when needed.

It is an object of this invention to provide an improved apparatus for minimizing the dust created in dispensing large amounts of particulate material. It is another object of this invention to provide an apparatus for dispensing dusty particulate material under choked flow conditions that is controlled so as to minimize the dispersal of dust. It is still another object of this invention to provide a means for discharging grain from a large bulk supply with a minimum of dust production. Still other objects will appear from the more detailed description of this invention which follows.

BRIEF SUMMARY OF THE INVENTION

This invention involves an apparatus for dispensing bulk particulate material in a controlled, choked flow comprising a conduit leading from a supply of the bulk material to a vertically depending hopper through a directional change in the conduit adapted to absorb a substantial amount of kinetic energy from the moving stream of particulate material immediately prior to the location where the particulate material falls into said hopper; closure means at the bottom of the hopper adjustable to any position from closed to wide open based on the weight of the particulate material in the hopper, greater weight causing a greater opening; a vertically extensible bellows connection between the hopper and the conduit upstream of the hopper; and a counterbalance weight to maintain the closure means in a closed position until a given weight of particulate material is in said hopper.

DETAILED DESCRIPTION OF THE INVENTION

Figure 1:
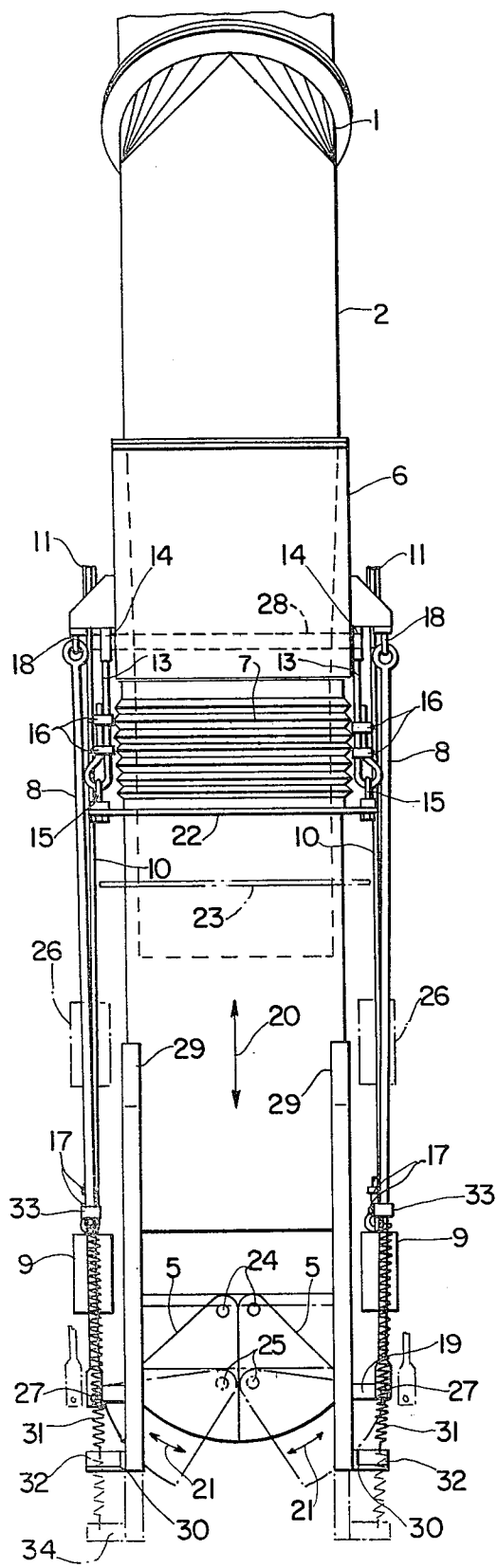
FIG. 1 is a front elevational view of the apparatus of this invention showing the closure means in a closed condition in solid lines and in an open condition in dotted lines.
Figure 2:
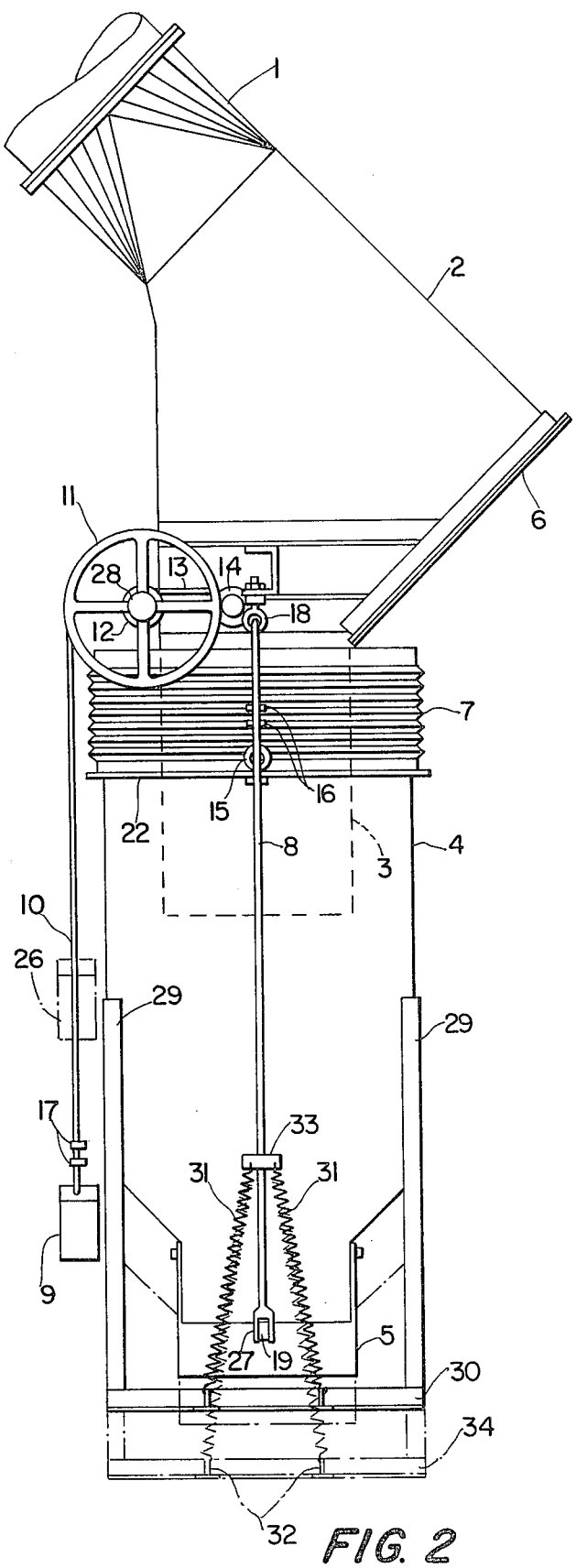
FIG. 2 is an elevational side view of the apparatus of this invention.

With particular reference to FIGS. 1 and 2 the apparatus of this invention may be readily understood. A large supply of bulk particulate material, e.g. grain, (not shown in these drawings) is discharged through an upstream conduit (1) and through an elbow (2) to change the direction of flow of the material to where it falls vertically through internal conduit (3) into hopper (4) to be discharged through closure means (5). The particulate material may enter upstream conduit (1) by gravity from a supply of the material at a higher elevation or it may be supplied to this point by any type of conveyor system known to those skilled in this art. Elbow (2) is fitted with a cushion box (6) which absorbs the kinetic energy in the flowing stream of particulate material and permits the material to fall freely by gravity through internal conduit (3) into hopper (4). If desired for reducing the velocity of flow of particulate material, there may be baffles employed in the space of elbow (2) or conduit (3). Hopper (4) is joined to conduit elbow (2) by a flexible bellows section (7) which provides hopper (4) with the ability to move vertically in accordance with the extension or contraction of the bellows section (7) as shown by arrows (20). This bellows section (7) serves the purpose of being a flexible enclosure to completely contain all of the dust within the moving mass of particulate material and to prevent the dispersal of that dust into the surrounding atmosphere. This bellows section (7) is made of any suitable material which is impervious to the particulate material and the dust inside the conduit sections. Normally the bellows section (7) might be made of any plastic or rubbery type material such as polyvinylchloride, polyethylene, neoprene, polyurethane, polypropylene, etc. Such connections are well known in the art and need not, therefore, be described in detail here. The remaining portions of conduit section (1), (2), (3), (4), and (6) are desirably made of sheet metal with appropriate framing and stiffening members where necessary.

The remaining portion of this apparatus is designed to maintain the closure means (5) in a closed position until there is sufficient weight of material in hopper (4) to cause, through a means which will be described, closure means (5) to open an amount which is proportional to the weight of material in hopper (4). The type of closure means which is shown in these drawings is frequently referred to as a "clam shell" which is formed in two similar portions that are pivoted at (24) so as to provide the possibility of opening by swinging to the right or the left, respectively, as shown by arrows (21), about pivots (24). The position shown in FIG. 1 is with closure means (5) in a fully closed position. The outer extremities of each of the closure means sections (5) is connected through an arm (19) welded to the bottom of closure means (5) and joined in a pivotal relationship to pin (27) at the bottom of connecting rod (8). The upper end of connecting rod (8) is joined through an eye to eyebolt (18) which is fixed to the housing of conduit elbow (2) by appropriate nuts. The connection between connecting rod (8) and eyebolt (18) is such that connecting rod (8) is free to move in a pivotal relationship around eyebolt (18) but it cannot move vertically except for whatever looseness in fitting there may be with eyebolt (18) and with pin (27). It will be seen that with this relatively fixed connection between the upper portion of the apparatus which is stationary and the outer corners of closure means (5) the vertical movement of hopper (4) will cause closure means (5) to open or close accordingly.

In order to support hopper (4) when it is in various stages of being filled with heavy particulate material there is provided a counterbalance system. The hopper frame (22) is fitted with an eyebolt (15) on each side of the hopper as shown in FIG. 1. Wire rope (13) is attached to eyebolt (15) by suitable clamps (16) and wire rope (13) is then passed over small pulley (14) to windlass (12). Wire rope (13) is attached to windlass (12) by any suitable means (not shown) such as by clamps or the like. Windlass (12) is mounted on shaft (28), and on that same shaft it is mounted large pulley (11) so that whatever portion of a revolution is made by windlass (12) the same portion of a revolution is made by large pulley (11). Wire rope (10) is mounted on pulley (11) and one end of that wire rope (10) is fixed to pulley (11) in the same manner as wire rope (13) is fixed to windlass (12). The other end of wire rope (10) is fixed by means of suitable clamps (17) to a weight (9). The size of weight (9) shall be large enough to function as a counterbalance to the total of the weight of hopper (4) and enough particulate to provide a reservoir of material with sufficient volume to assure that a choked condition can be maintained during the normal operation of this apparatus. This system of pulleys and counterbalance weights provides an upwardly directed force on hopper (4) directly opposed to the downwardly directed force of the combined weight of hopper (4) and its contents. By suitable brief experimentation the proper weight can be chosen as counterbalance weight (9) to serve with whatever volume of hopper (4) and whatever density of particulate material is to be dispensed through that hopper. Other arrangements can be made to serve the same purpose of counterbalancing the weight of hopper (4). For example pulleys (11) and L94) may be in line so that a single wire rope extends from eyebolt (15) over pulleys (14) and (11) to weight (9). Still other arrangements will be apparent to those skilled in such matters.

In a particularly preferred embodiment of this invention there are additional springs employed to dampen the reaction of the apparatus as it encounters changes in flow rates. Utilizing the characteristic inherent in a spring under tension that the force required to lengthen a spring increases as it is extended springs are employed to slow the rate of movement of the hopper downwards as the state of equilibrium is approached and speed the rate of closing at the moment that a weight loss develops for any reason. As shown in FIGS. 1 and 2 of this dampening effect is produced by two pairs of snubbing springs (31) clamped at one end to connecting rods (8) and at the other end to crossbars (30) which are rigidly fixed to hopper (4). Crossbars (30) are attached to hopper (4) through crossbar supports (29) welded or otherwise fixed to the corners of hopper (4). Crossbar spring anchors (32) are fixed to crossbar (30) and connecting rod spring anchors (33) are adjustably attached to connecting rods (8) so that the tension in springs (31) may be adjusted to find the optimum dampening effect. It is to be understood that this arrangement is not needed for the basic apparatus to operate, but that it is a preferred mode of operation.

In order to show the operation of the apparatus of this invention there will be seen on FIG. (1) in dotted lines how the weight of material inside hopper (4) causes closure means (5) to open. When sufficient material inside of hopper (4) has been received its weight causes hopper (4) to move downwardly in opposition to counterbalance weight (9). When hopper frame (22) has moved to the position shown at (23) counterbalance weights (9) will move to positons shown at (26) in accordance with the respective diameters of windlass (12) and pulley (11). When hopper frame (22) has moved downwardly a vertical distance to the position at (23) closure pivots (24) will move downwardly exactly that same distance to positions shown at (25). Since connecting rods (8) cannot move vertically, they necessarily cause each of the two portions of closure means (5) to swing outwardly which in turn causes connecting rods (8) to swing outwardly a corresponding amount to accomodate the movement of closure means (5) and arms (19). It will be seen that if an even greater weight of particulate material is in hopper (4) frame (22) moves even further downwardly beyond the position shown at (23) which in turn causes the remainder of hopper (4) to move that same distance downwardly and causes closure means (5) to swing to an even wider open position. As the material is dispensed from inside of hopper (4) and the weight of material in hopper (4) is lessened hopper (4) will move upwardly and this will immediately translate to a more closed position of closure means (5). It will be seen that by suitably choosing the mass of counterbalance weights (9) the operator can provide whatever position he wishes for the closure means (5) and thus provides a choked flow to minimize the dispersal of dust. When snubbing springs (31) are included in the device crossbar (30) will move to position (34) causing a much greater tension in springs (31) and thereby tending to move hopper (4) upwards to cause closing of closure means (5). This effect can be increased or decreased by moving spring anchor (33) upward or downward on connecting rod (8).

Although the invention has been described in considerable detail with reference to certain preferred embodiments thereof it will be understood that variations and modifications can be effected within the spirit and scope of the invention as described here and above and as defined in the appended claims.

I claim:

1. An apparatus for dispensing bulk, particulate material in a controlled, choked flow, comprising a conduit leading from a supply of the bulk material to a vertically depending hopper through a directional change in the conduit adapted to absorb a substantial amount of kinetic energy from the moving stream of particulate material immediately prior to the location where the particulate material falls into said hopper, closure means comprising a pair of pivotally operated clam shell members at the bottom of the hopper adjustable to any position from closed to wide open based on the weight of particulate material in the hopper, greater weight causing a larger opening, a vertically extensible bellows connection between the hopper and the conduit upstream of the hopper, and a counterbalance weight providing an upwardly directed force on said hopper to maintain the closure means in a closed position until a given weight of particulate material is in said hopper.

2. The apparatus of claim 1 wherein each of the pair of clams shell members is at its outer extremity attached to the conduit upstream of the hopper, so as to cause opening of the members as said hopper moves vertically downward, and the counterbalance weights are attached by pulley and rope means to said hopper.

3. The apparatus of claim 1 wherein in addition to said counterbalance weight there is an adjustable spring means also providing an upwardly directed force on said hopper.

* * * * *